(12) United States Patent
Uda

(10) Patent No.: US 6,694,136 B2
(45) Date of Patent: *Feb. 17, 2004

(54) RADIO COMMUNICATION SYSTEM, TERMINAL EQUIPMENT USED THEREFOR AND SERVICE CONTROL STATION USED THEREFOR

(75) Inventor: Yoshihide Uda, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/135,036

(22) Filed: Apr. 29, 2002

(65) Prior Publication Data

US 2002/0128010 A1 Sep. 12, 2002

Related U.S. Application Data

(63) Continuation of application No. 09/185,948, filed on Nov. 4, 1998.

(51) Int. Cl.7 .................................................. H04Q 7/20
(52) U.S. Cl. ...................... 455/426; 455/412; 455/413; 455/424; 455/461; 370/328; 370/329
(58) Field of Search ................................ 455/426, 412, 455/413, 424, 461; 370/328, 329, 338

(56) References Cited

U.S. PATENT DOCUMENTS

| | | | | |
|---|---|---|---|---|
| 4,876,738 A | * | 10/1989 | Selby | 455/432 |
| 5,313,653 A | * | 5/1994 | Sasuta | 455/17 |
| 5,579,375 A | | 11/1996 | Ginter | |
| 5,590,127 A | * | 12/1996 | Bales et al. | 348/14.09 |
| 5,613,198 A | * | 3/1997 | Ahmadi et al. | 370/329 |
| 5,613,213 A | | 3/1997 | Naddell et al. | |
| 5,689,245 A | | 11/1997 | Noreen et al. | |
| 5,920,815 A | | 7/1999 | Akhavan | |
| 5,960,341 A | | 9/1999 | Leblanc et al. | |
| 6,016,430 A | | 1/2000 | Shinomiya | |
| 6,097,733 A | | 8/2000 | Basu et al. | |
| 6,462,646 B2 | * | 10/2002 | Helferich | 340/7.21 |

FOREIGN PATENT DOCUMENTS

JP   8-214373 A   *   8/1996

* cited by examiner

Primary Examiner—Lee Nguyen
Assistant Examiner—Marceau Milord
(74) Attorney, Agent, or Firm—Scully, Scott, Murphy & Presser

(57) ABSTRACT

There is provided a radio communication system including (a) a plurality of terminal equipments connected to one another by a radio system through a radio base station connected to a communication line, and (b) a service control station existing on the communication line, and controlling communication among the terminal equipments, the terminal equipments being designed to be capable of communicating data information with one another through the service control station. For instance, the data information includes picture data, image data, and audio data. For instance, each of the terminal equipments is comprised of a simplified personal handyphone. In accordance with the radio communication system, a terminal equipment or a PHS terminal equipment stores only minimum index information in an internal storage circuit, and hence, it is no longer necessary to store data information. This is realized by a small-sized storage circuit.

30 Claims, 3 Drawing Sheets

RADIO COMMUNICATION SYSTEM, TERMINAL EQUIPMENT USED THEREFOR AND SERVICE CONTROL STATION USED THEREFOR

This is a continuation of application Ser. No. 09/185,948 filed Nov. 4, 1998.

BACKGROUND OF THE INVENTION

1. Field of the Invention

The present invention relates to a radio communication system, a terminal equipment used therefor, and a service control station therefor, and more particularly to data communication in a radio communication system using a terminal equipment such as a cellular phone and a simplified personal handyphone.

2. Description of the Related Art

In recent years, there has been increased a demand of data communication using a simplified personal handyphone system. In such data communication, a text document and/or high-capacity data information such as picture data, image data, and audio data are communicated between simplified personal handyphones (PHS terminal equipments). Those data information can be edited in such PHS terminal equipments for retransmission.

In order to realize the above-mentioned functions, an increase in costs and a size of a PHS terminal equipment is feared. Japanese Unexamined Patent Publication No. 8-214373 has suggested one of solutions to such a problem.

In the radio communication system suggested in the Publication, transmitted data information is not stored in a PHS terminal equipment as a transmitter, but is once stored in a storage circuit of a service control station after index information has been added thereto. The service control station transmits only data information to the PHS terminal equipment as a receiver. Thereby, an increase in costs and expansion in size due to an increase in a capacity of a memory is prevented.

Moreover, in the described-above radio communication system, the PHS terminal equipment as a transmitter is able to transmit a request for reproducing data information to the service control station. After receiving a list of data information, the PHS terminal equipment as a transmitter retrieves the list, and notifies desired data information of the service control station. As a result, the PHS terminal equipment receives the desired data information from the service control station for re-edition or re-transmission.

However, the above-mentioned radio communication system has problems as follows.

A first problem is that in the case of obtaining data to be edited or re-transmitted, or of checking transmission history, a PHS terminal equipment has to transmit a request for transmitting thereto a list of data which the service control station has received, to the service control station. This is accompanied with a problem that communication fee is increased, and communication traffic is also caused.

A second problem is that in the case that data is transmitted to a first PHS terminal equipment from a second PHS terminal equipment, the first PHS terminal equipment has to receive the data without checking regardless of whether the data is necessary therefor or not. This is accompanied with problems that communication traffic is increased by receiving unnecessary high-capacity, and that there is a possibility of reduction in security because of any data information being received without checked.

SUMMARY OF THE INVENTION

It is an object of the present invention to provide a radio communication system, a terminal equipment used therefor, and a service control station used therefor, which make it possible to enhance a transmission efficiency, ensure security, and fabricate a terminal equipment in a smaller size and a smaller weight.

In one aspect, there is provided a radio communication system including (a) a plurality of terminal equipments connected to one another by a radio system through a radio base station connected to a communication line, and (b) a service control station existing on the communication line, and controlling communication among the terminal equipments, the terminal equipments being designed to be capable of communicating data information with one another through the service control station.

For instance, the data information includes picture data, image data, and audio data. For instance, each of the terminal equipments is comprised of a simplified personal handyphone.

It is preferable that each of the terminal equipments includes a device for editing the data information and index information acting as an index of the data information, at a display section, and transmitting the data information and the index information to the service control station.

For instance, the index information includes at least a destination to which the data information is to be transmitted, a transmitter of the data information, an index of the data information, and a time at which the data information was transmitted.

It is preferable that each of the terminal equipments includes a device for receiving the data information and index information acting as an index of the data information from the service control station, and displaying the data information and the index information at a display section for edition.

It is preferable that each of the terminal equipments includes a device for storing only index information acting as an index of the data information, in a memory, and retrieving the index information stored in the memory.

It is preferable that each of the terminal equipments includes a device for transmitting a request to the service control station for transmitting thereto data information associated with the retrieved index information.

It is preferable that each of the terminal equipments includes a device for editing data information and index information both received from the service control station, and transmitting the thus edited data information and index information to the service control station.

It is preferable that each of the terminal equipments includes a device for storing only index information acting as an index of the data information, received from the service control station, and annunciating a user that the index information has been received.

It is preferable that each of the terminal equipments is comprised of (a) a radio communication section for making radio communication with a radio base station, (b) a radio control section for, when data information and index information acting as an index of the data information are to be transmitted to another terminal equipment transmitting thereto a request for transmitting the data information and the index information to the another terminal equipment, establishing a radio data frame, based on the data information, the index information, and the request, and for, when data information and index information are to be received from another terminal equipment, demodulating a received radio data frame, and extracting data information and index information from the thus demodulated radio data frame, (c) a first memory for storing therein index information to be transmitted, (d) a second memory for storing received index information therein, (e) a data processor for processing data to be transmitted and received data, and (f) an annunciator for annunciating a user that index information has been received.

It is preferable that the service control station includes a device for receiving data information and index information transmitted from one of the terminal equipments, storing the data information and index information in a memory, and transmitting only the index information to other terminal equipment.

It is also preferable that the service control station includes a device for, when a request for transmitting data information to a terminal equipment is received, retrieving the data information in a memory, and transmitting the data information to the terminal equipment.

For instance, the service control station may be designed to include (a) a first memory for storing index information acting as an index of the data information, (b) a second memory for storing the data information therein, and (c) a data processor for (c-1) extracting the index information, the data information, and a request for transmitting the index information and the data information to a terminal equipment, from a received radio data frame, (c-2) storing the index information in the first memory, and the data information in the second memory, and (c-3) identifying the terminal equipment by analyzing the index information, and transmitting the index information to the terminal equipment.

In another aspect, there is provided a terminal equipment to be used for a radio communication system wherein a terminal equipment is designed to be capable of communicating data information with one another through a service control station, comprising a device for editing the data information and index information acting as an index of the data information, at a display section, and transmitting the data information and the index information to the service control station.

There is further provided a terminal equipment to be used for a radio communication system wherein a terminal equipment is designed to be capable of communicating data information with one another through a service control station, including (a) a radio communication section for making radio communication with a radio base station, (b) a radio control section for, when data information and index information acting as an index of the data information are to be transmitted to another terminal equipment transmitting thereto a request for transmitting the data information and the index information to the another terminal equipment, establishing a radio data frame, based on the data information, the index information, and the request, and for, when data information and index information are to be received from another terminal equipment, demodulating a received radio data frame, and extracting data information and index information from the thus demodulated radio data frame, (c) a first memory for storing therein index information to be transmitted, (d) a second memory for storing received index information therein, (e) a data processor for processing data to be transmitted and received data, and (f) an annunciator for annunciating a user that index information has been received.

In still another aspect, there is provided a service control station to be used for a radio communication system wherein a terminal equipment is designed to be capable of communicating data information with one another through the service control station, including a device for receiving data information and index information acting as an index of the data information, transmitted from another terminal equipment, storing the data information and index information in a memory, and transmitting only the index information to still another terminal equipment.

There is further provided a service control station to be used for a radio communication system wherein a terminal equipment is designed to be capable of communicating data information with one another through the service control station, including (a) a first memory for storing index information acting as an index of the data information, (b) a second memory for storing the data information therein, and (c) a data processor for (c-1) extracting the data information, index information acting as an index of the data information, and a request for transmitting the index information and the data information to a terminal equipment, from a received radio data frame, (c-2) storing the index information in the first memory, and the data information in the second memory, and (c-3) identifying the terminal equipment by analyzing the index information, and transmitting the index information to the terminal equipment.

In accordance with the present invention, a terminal equipment or a PHS terminal equipment stores only minimum index information in an internal storage circuit, and hence, it is no longer necessary to store data information. This is realized by a small-sized storage circuit.

Furthermore, it is now possible to retrieve a list of data the service control station transmitted and a list of data the service control station received without connecting with the service control station, by means of a PHS terminal equipment, and to read out desired data from the service control station for display, edition, and/or re-transmission.

Moreover, when data has been transmitted to a PHS terminal equipment, an user can judge whether information relating to the transmitted data can be received, based on index information associated with the data information.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
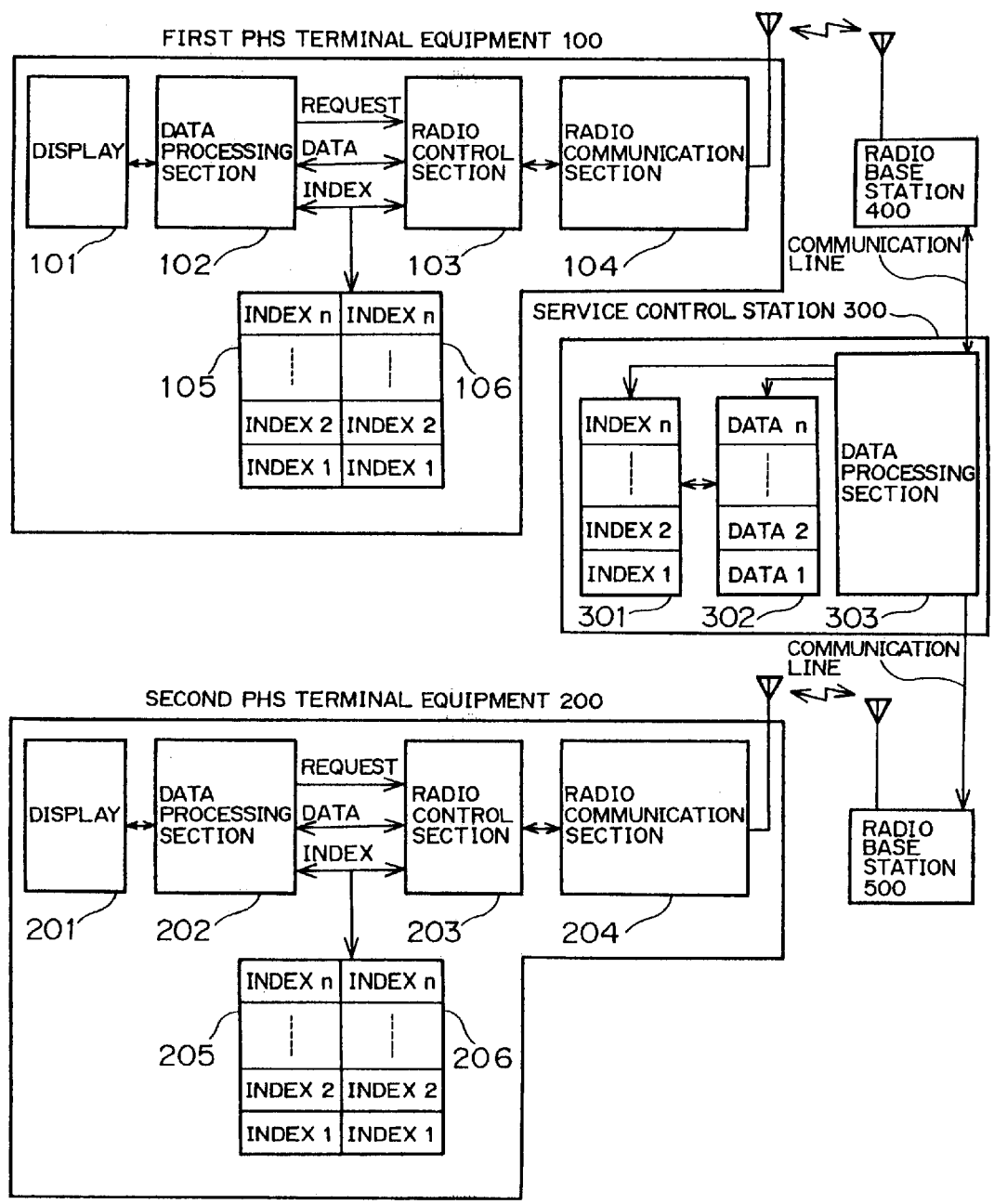
FIG. 1 is a system block diagram of the data communication system in accordance with a preferred embodiment of the present invention.

FIG. 1 is a block diagram of the radio communication system in accordance with a preferred embodiment of the present invention.

The radio communication system is comprised of a first PHS terminal equipment 100, a second PHS terminal equipment 200, a service control station 300, a first radio base station 400, and a second radio base station 500.

With reference to FIG. 1, a first PHS terminal equipment 100 is comprised of a radio communication section 104 for making radio communication with a first radio base station 400, a radio control section 103, a first storage circuit 105 for storing therein index information to be transmitted, a second storage circuit 106 for storing received index information therein, a data processor 102 for processing data to be transmitted and data having been received, and a display 101 for displaying data to be transmitted and data having been received so that a user can edit those data, and annunciating a user that index information has been received.

The radio control section 103, when data information and index information acting as an index of the data information are to be transmitted to another terminal equipment transmitting thereto a request for transmitting the data information and the index information to the another terminal equipment, establishes a radio data frame, based on the data information, the index information, and the request, modulates the thus established radio data frame, and transmits the thus modulated radio data frame to the radio communication section 104. When data information and index information are to be received from another terminal equipment, the radio control section 103 demodulates a radio data frame having been received through the radio communication section 104, and extracts data information and index information from the thus demodulated radio data frame.

When data is to be transmitted from the first PHS terminal equipment 100, the data processing section 102 produces index information after receiving data having been edited in the display 101, and stores the index information in the first storage circuit 105, as well as outputs the data information and index information to the radio control section 103. When the first PHS terminal equipment 100 receives index information, the data processing section 102 stores the received index information in the second storage circuit 106.

When any index information stored in the second storage circuit 106 is selected by a user, the selected index information and a request for transmitting thereto data information associated with the selected index information are output to the radio control section 103. Thus, a user can retrieve the first and second storage circuits 105 and 106 through the display 101 to thereby select desired index information.

A second PHS terminal equipment 200 has the same structure as the structure of the first PHS terminal equipment 100. A radio communication section 204, a radio control section 203, a data processing section 202, a display 201, a first storage circuit 205, and a second storage circuit 206 have the same structure and function as those of the radio communication section 104, the radio control section 103, the data processing section 102, the display 101, the first storage circuit 105, and the second storage circuit 106, respectively.

Hereinafter, a structure of a service control station 300 is described. The service control station 300 can connect a PHS terminal equipment with a communication line through the first and second radio base stations 400 and 500. The service control station 300 is comprised by a first storage circuit index area 301 for storing index information therein, a second storage circuit data area 302 for storing data information therein, and a data processing section 303.

The data processing section 303 extracts index information, data information, and a request for transmitting the index information and data information to a terminal equipment, from a received radio data frame, and stores the received index information in the first storage circuit index area 301, and the received data information in the second storage circuit index area 302. The data processing section 303 further identifies the terminal equipment transmitting the above-mentioned request, by analyzing the index information, and transmits the index information to the terminal equipment by connecting the terminal equipment to a communication line.

The data processing section 303, when extracting such a request as mentioned above from a radio data frame, selects data information associated with the index information in the second storage circuit data area 302, and transmits the thus selected data information to a PHS terminal transmitting the above-mentioned request.

Hereinafter, an operation of the radio communication system in accordance with the embodiment is explained with reference to FIGS. 2 and 3.

Figure 2:
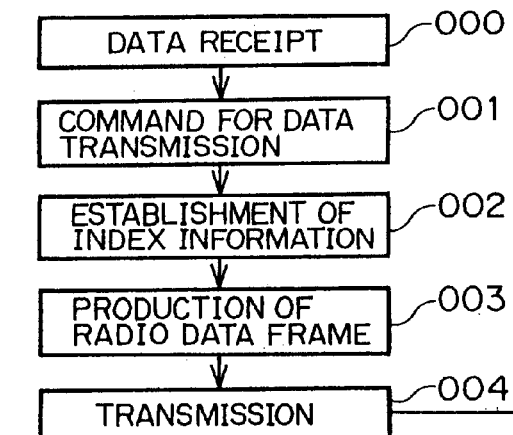
FIG. 2 is a flow chart of the data communication system in accordance with a preferred embodiment of the present invention.
Figure 2:
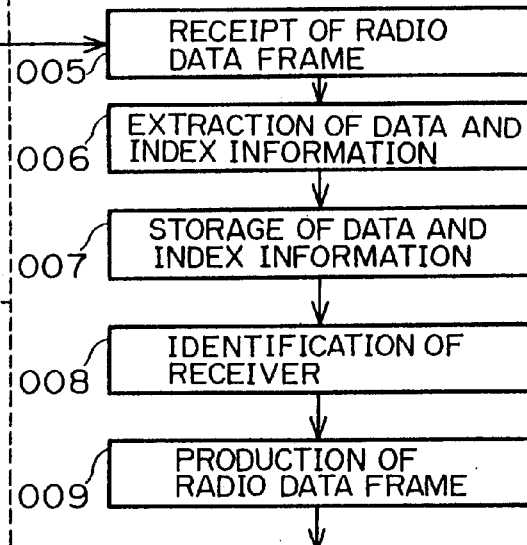
Figure 2:
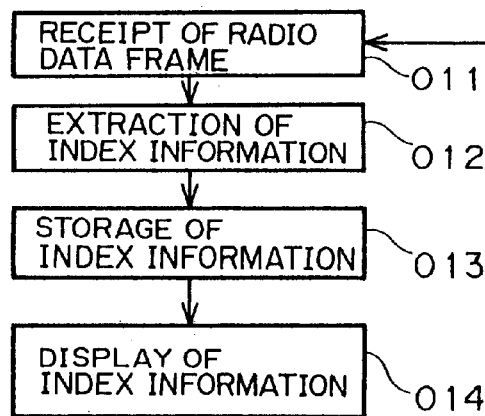

FIG. 2 illustrates an example of an operation where the first PHS terminal equipment 100 as a transmitter transmits data to the second PHS terminal equipment 200 as a receiver.

The first PHS terminal equipment 100 as a transmitter first receives data to be transmitted and information about a receiver and an index through the display 101 from a user, at step 000.

When a command for starting transmission of data is input through the display 101 at step 001, after the first PHS terminal equipment 100 has received data, the data processing section 102 establishes both data information from the data and index information from information about the receiver and the index, at step 002. The thus established data information and index information are output to the radio control section 103, which produces a radio data frame based on the data information and the index information, at step 003.

After production of the radio data frame, a communication line is connected between the first PHS terminal equipment 100 and the service control station 300, and then, the radio data frame starts to be transmitted at step 004. The index information is turned into a radio data frame, and concurrently, stored in the first storage circuit 105.

With the operation sequence described so far, the transmission operation of the first PHS terminal 100 as a transmitter is terminated.

On receipt of the radio data frame from the first PHS terminal 100 as a transmitter at step 005, the data processing section 303 of the service control station 300 extracts data information and index information from the received radio data frame at step 006, and stores the data information in the second storage circuit data area 302 and the index information in the first storage circuit index area 301, at step 007.

Thereafter, the data processing section 303 identifies the second PHS terminal equipment 200 as a receiver on the basis of the received index information at step 008, and produces a radio data frame to be transmitted to the second PHS terminal equipment 200, based on the received index information. After the radio data frame has been produced as step 009, a communication line is connected between the data processing section 303 and the second PHS terminal 200 a receiver, the radio data frame starts being transmitted at step 010. With the operation sequence described so far, the transmission operation of the service control station 300 is terminated.

After receiving the radio data frame from the service control station 300 at step 011, the data processing section 202 of the second PHS terminal 200 as a receiver extracts index information from the radio data frame at step 012, and stores the extracted index information in the second storage circuit 206 at step 013.

Then, a list of the extracted index information is displayed at the display 201 to notify a user that index information is newly received, at step 014.

With the operation sequence described so far, the receipt operation of the PHS terminal 200 as a receiver is terminated.

Figure 3:
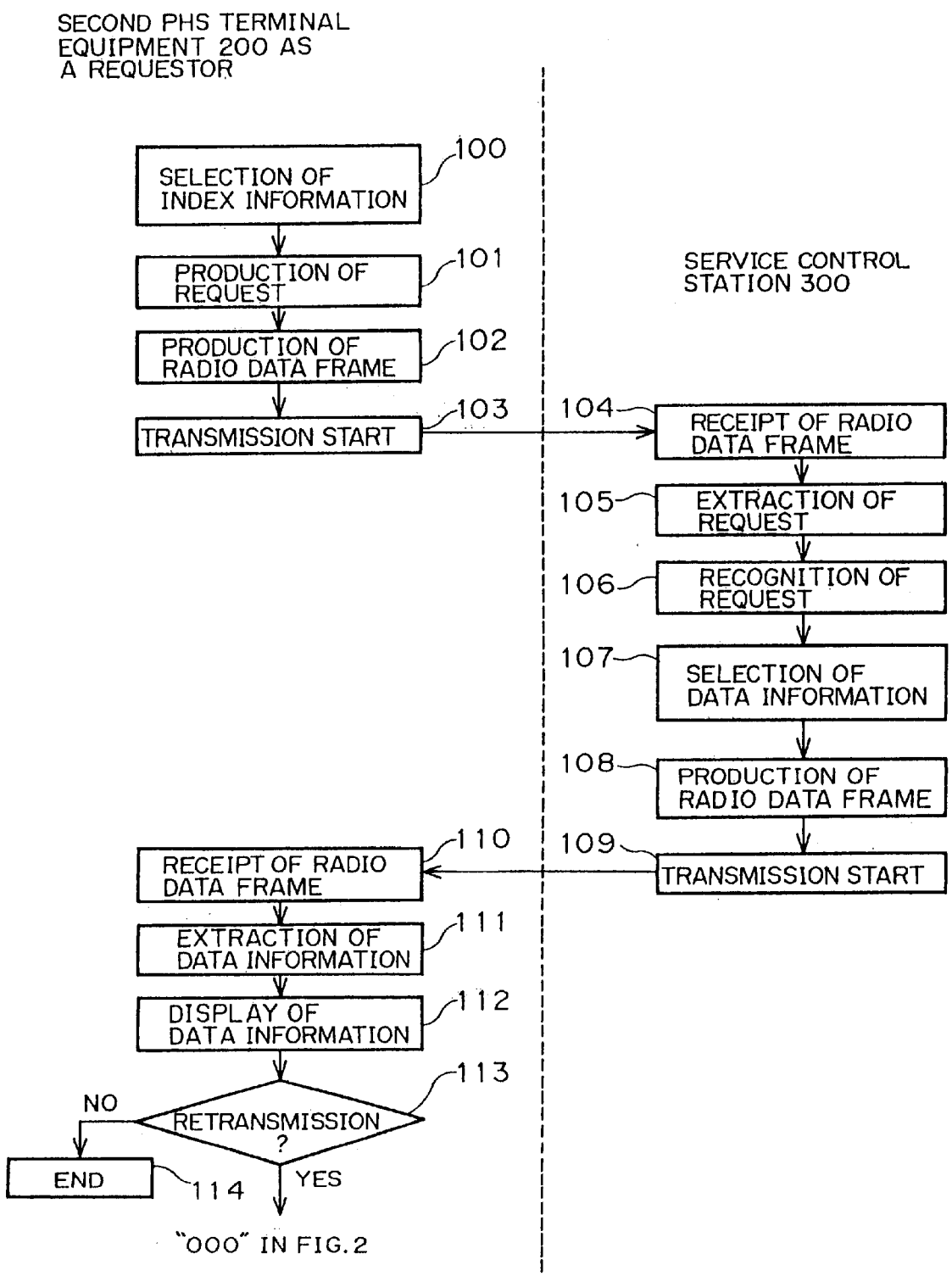
FIG. 3 is a flow chart of the data communication system in accordance with a preferred embodiment of the present invention.

FIG. 3 shows an example of an operation where a user retrieves lists of data having been transmitted and received on a PHS terminal equipment, selects desired index information among the lists, displays data information in the display, and edits and re-transmits the data information.

For example, a user employing the second PHS terminal equipment 200 as a requestor selects index information associated with data information which the user requires to display, to edit and to retransmit, in the lists of data having been transmitted and received, through the display 201, at step 100.

When index information among the lists is selected, the data processing section 202 automatically produces a request for transmitting thereto data information associated with the selected index information, at step 101. Then, a radio data frame is established at step 102, based on the request and the selected index information. After establishment of the radio data frame, a communication line is connected between the second PHS terminal equipment 200 and the service control station 300, and thus, the radio data frame starts being transmitted, at step 103.

When the service control station 300 receives the radio data frame at step 104, the data processing section 303 extracts the request out of the received radio data frame at step 105.

On recognition of the request, the service control station 300 selects data information associated with the index information in the second storage circuit data area 302 at step 107. Then, the service control station 300 produces a radio data frame based on the thus selected data information at step 108.

The thus produced radio data frame is transmitted to the second PHS terminal 200 as a requestor. On receipt of the radio data frame at step 110, the second PHS terminal equipment as a requestor extracts data information from the received radio data frame at step 111, and displays the thus extracted data information at the display 101 at step 112.

At this time, when a user requests to edit and retransmit data, a transition to step 000 shown in FIG. 2 is performed, at step 113. If a user does not request to do so, the operation is terminated, at step 114.

With the operation described above, it is possible to retrieve index information in the lists of data having been transmitted and received, receive data information associated with the retrieved index information, edit the received data information, and retransmit the edited data information.

The above-mentioned embodiments employ a PHS terminal equipment as an example, which is known as a simplified personal handyphone which is advantageous in the viewpoint of communication fee, however, it should be noted that a cellular phone may be employed in the embodiments in place of a PHS terminal equipment. As an alternative, both a simplified personal handyphone and a cellular phone may be employed in the radio communication system in accordance with the above-mentioned embodiments.

While the present invention has been described in connection with certain preferred embodiments, the present invention provides advantages as follows.

The first advantage is that since minimum index information is stored in a storage circuit incorporated in a terminal equipment such as a simplified personal handyphone and a cellular phone, it is possible to avoid an increase in costs and size of a terminal equipment.

Since a conventional terminal equipment does not store index information therein, it is necessary to connect a communication line to a service control station to thereby receive lists of data having been transmitted and received, in order to retrieve the lists. This is accompanied with a problem of an increase in communication fee and communication traffic. The present invention makes it no longer necessary for a terminal equipment to connect to a service control station all time in order to retrieve the lists. This brings a profit of free communication fee.

The second advantage is that when a terminal equipment as a data receiver receives data, the terminal equipment first receives only index information, and then, a user can determine whether the terminal equipment receives the data or not, based on the received index information. A conventional terminal equipment had to receive all data, regardless of whether a user required the data or not; This was accompanied with a problem of an increase in communication traffic and reduction in security. The present invention solves this problem.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-317641 filed on Nov. 4, 1997 including specification, claims, drawings and summary is incorporated herein by reference in its entirety.

What is claimed is:
1. A radio communication system comprising:
    (a) a plurality of terminal equipment connected to one another by a radio system through a radio base station connected to a communication line; and
    (b) a service control station existing on said communication line and controlling communication among said plurality of terminal equipment, said plurality of terminal equipment being capable of communicating data information with one another through said service control station,
    said service control station receiving data information and index information acting as an index of said data information from a transmitter terminal equipment, forwarding the index information to a receiver terminal equipment upon receipt of the data information and the index information, and transmitting the data information to the receiver terminal equipment upon request from the receiver terminal equipment.
2. The radio communication system as set forth in claim 1, wherein said data information includes picture data, image data, and audio data.
3. The radio communication system as set forth in claim 1, wherein each of said plurality of terminal equipment is comprised of a simplified personal handyphone.
4. The radio communication system as set forth in claim 1, wherein each of said plurality of terminal equipment includes means for editing said data information and index information acting as an index of said data information, at a display section, and transmitting said data information and said index information to said service control station.

5. The radio communication system as set forth in claim 4, wherein said index information includes at least a destination to which said data information is to be transmitted, a transmitter of said data information, an index of said data information, and a time at which said data information was transmitted.

6. The radio communication system as set forth in claim 1, wherein each of said plurality of terminal equipment includes means for receiving said data information and index information acting as an index of said data information from said service control station, and displaying said data information and said index information at a display section for edition.

7. The radio communication system as set forth in claim 1, wherein each of said plurality of terminal equipment includes means for storing only index information acting as an index of said data information, in a memory, and retrieving said index information stored in said memory.

8. The radio communication system as set forth in claim 7, wherein each of said plurality of terminal equipment includes means for transmitting a request to said service control station for transmitting thereto data information associated with the retrieved index information.

9. The radio communication system as set forth in claim 1, wherein each of said plurality of terminal equipment includes means for editing data information and index information both received from said service control station, and transmitting the thus edited data information and index information to said service control station.

10. The radio communication system as set forth in claim 1, wherein each of said plurality of terminal equipment includes means for storing only index information acting as an index of said data information, received from said service control station, and annunciating to a user that said index information has been received.

11. The radio communication system as set forth in claim 1, wherein said service control station includes means for receiving data information and index information acting as an index of said data information transmitted from one of said plurality of terminal equipment, storing said data information and index information in a memory, and transmitting only said index information to other terminal equipment.

12. The radio communication system as set forth in claim 1, wherein said service control station includes means for, when a request for transmitting data information to a terminal equipment is received, retrieving said data information stored in a memory, and transmitting said data information to said terminal equipment.

13. The radio communication system as set forth in claim 1, wherein said service control station includes:
a first memory for storing index information acting as an index of said communicated data information;
a second memory for storing said communicated data information; and
a data processor for (i) extracting said data information, index information acting as an index of said data information, and a request for transmitting said index information and said data information to said receiver terminal equipment, from a radio data frame received from said transmitter terminal equipment, (ii) storing said extracted index information in said first memory, and said extracted data information in said second memory, and (iii) identifying said receiver terminal equipment by analyzing said index information, transmitting said index information to said receiver terminal equipment upon receipt of said data information and said index information, and transmitting said data information to said receiver terminal equipment upon request from said receiver terminal equipment.

14. A terminal equipment used for a radio communication system wherein a plurality of terminal equipment is capable of communicating data information with one another through a service control station, said terminal equipment comprising:
means for editing said data information and index information acting as an index of said data information at a display section of said terminal equipment; and
means for transmitting said data information and said index information to said service control station, wherein said index information is transmitted to a receiver terminal equipment upon receipt of the data information and the index information at the service control station, and said data information is transmitted to said receiver terminal equipment upon request from said receiver terminal equipment.

15. The terminal equipment as set forth in claim 14, wherein said index information includes at least a destination to which said data information is to be transmitted, a transmitter of said data information, an index of said data information, and a time at which said data information was transmitted.

16. The terminal equipment as set forth in claim 14, further including means for receiving said data information and said index information from said service control station, and displaying the thus received data information and index information at a display section for edition.

17. The terminal equipment as set forth in claim 14, further including means for storing only said index information in a memory, and retrieving said index information stored in said memory.

18. The terminal equipment as set forth in claim 17, farther including means for transmitting a request to said service control station for transmitting thereto data information associated with the retrieved index information.

19. The terminal equipment as set forth in claim 14, farther including means for editing said data information and said index information both received from said service control station, and transmitting the thus edited data information and index information to said service control station.

20. The terminal equipment as set forth in claim 14, further including means for storing only said index information received from said service control station, and annunciating to a user that said index information has been received.

21. The terminal equipment as set forth in claim 14, wherein said data information includes picture data, image data, and audio data.

22. The terminal equipment as set forth in claim 14, wherein said terminal equipment is comprised of a simplified personal handyphone.

23. The terminal equipment as set forth in claim 14, wherein said index information includes at least a destination to which said data information is to be transmitted, a transmitter of said data information, an index of said data information, and a time at which said data information was transmitted.

24. A service control station to be used for a radio communication system wherein a plurality of terminal equipment is capable of communicating data information with one another through said service control station, said service control station comprising:

means for receiving data information and index information acting as an index of said data information, transmitted from a first terminal equipment storing said data information and said index information in a memory; and means for transmitting said index information to a second terminal equipment upon receipt of the data information and the index information and transmitting said data information to the second terminal equipment upon request from said second terminal equipment.

25. The service control station as set forth in claim 24, further including means for, when a request for transmitting data information to a terminal equipment is received, retrieving said data information in a memory, and transmitting said data information to said terminal equipment.

26. The service control station as set forth in claim 24, wherein said data information includes picture data, image data, and audio data.

27. The service control station as set forth in claim 24, wherein said index information includes at least a destination to which said data information is to be transmitted, a transmitter of said data information, an index of said data information, and a time at which said data information was transmitted.

28. A service control station to be used for a radio communication system wherein a plurality of terminal equipment is capable of communicating data information with one another through said service control station, said service control station comprising:

a first memory for storing index information acting as an index of said communicated data information;

a second memory for storing said communicated data information; and a data processor for (i) extracting data information, index information acting as an index of said data information, and a request for transmitting said index information and said data information to a receiver terminal equipment, from a radio frame received from a transmitter terminal equipment, (ii) storing said extracted index information in said first memory, and said extracted data information in said second memory, and (iii) identifying said receiver terminal equipment by analyzing said index information, transmitting said index information to said receiver terminal equipment upon receipt of the data information and the index information, and transmitting said data information to said receiver terminal equipment upon request from said receiver terminal equipment.

29. The service control station as set forth in claim 28, wherein said data information includes picture data, image data, and audio data.

30. The service control station as set forth in claim 28, wherein said index information includes at least a destination to which said data information is to be transmitted, a transmitter of said data information, an index of said data information, and a time at which said data information was transmitted.

* * * * *